Figure 1:
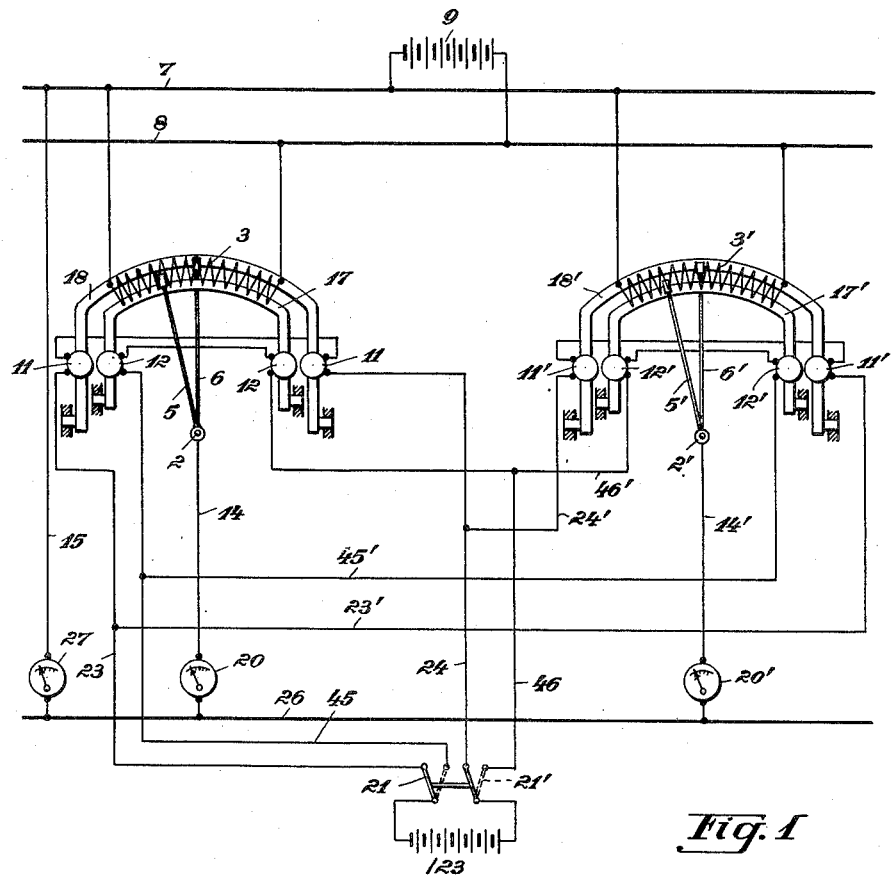

Nov. 2, 1926.　　　　　　　　　　　　　　　1,605,103
F. EICHLER ET AL
ARRANGEMENT FOR THE REMOTE TRANSMISSION OF THE POSITIONS OF POINTERS
Filed June 3, 1926　　　　2 Sheets-Sheet 1

Inventors
Fritz Eichler,
Manfred Schleicher
by Knight Bros
attorneys

Nov. 2, 1926.
F. EICHLER ET AL
1,605,103
ARRANGEMENT FOR THE REMOTE TRANSMISSION OF THE POSITIONS OF POINTERS
Filed June 3, 1926    2 Sheets-Sheet 2
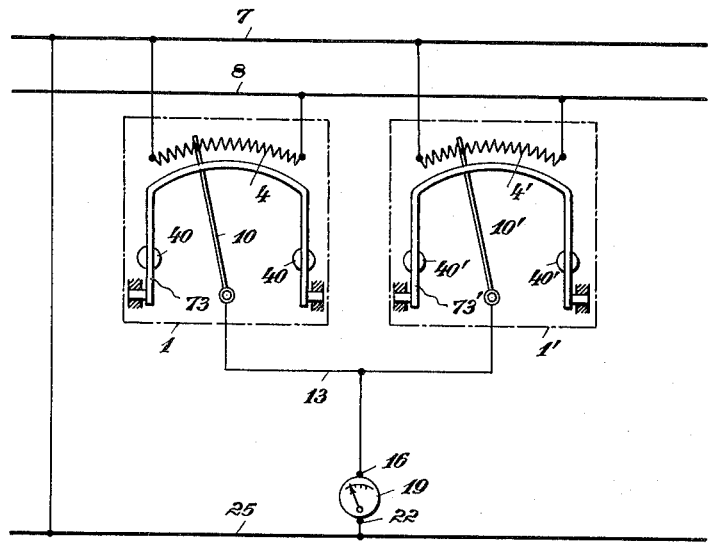
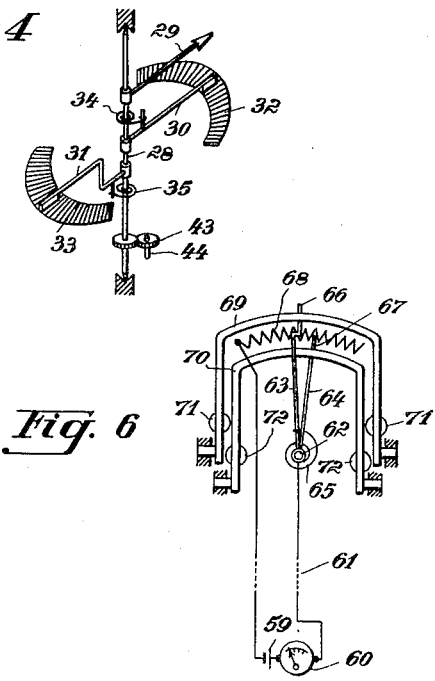
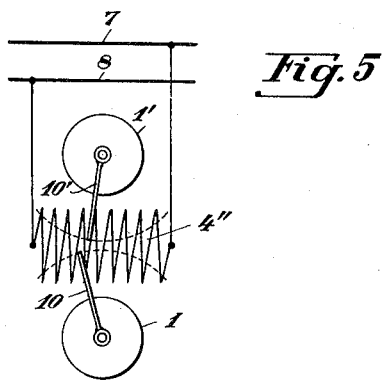
Inventors
Fritz Eichler,
Manfred Schleicher
by Knight Bros
Attorneys Patented Nov. 2, 1926.

1,605,103

UNITED STATES PATENT OFFICE.

FRITZ EICHLER, OF BERLIN, AND MANFRED SCHLEICHER, OF BERLIN-CHARLOTTENBURG, GERMANY, ASSIGNORS TO SIEMENS & HALSKE, AKTIENGESELLSCHAFT, OF SIEMENSSTADT, NEAR BERLIN, GERMANY, A CORPORATION OF GERMANY.

ARRANGEMENT FOR THE REMOTE TRANSMISSION OF THE POSITIONS OF POINTERS.

Application filed June 3, 1926, Serial No. 113,542, and in Germany December 31, 1924.

Our invention relates to a system or arrangement for the remote transmission of the positions of pointers, particularly of the pointers of measuring instruments, and more specifically to such a system or arrangement of this kind in which means are provided which bring the pointers, the position of which is to be transmitted to a remote station, in contact with a resistance arrangement which may be connected either as a voltage divider or as regulating resistance.

In the hitherto known systems or arrangements of this kind the pointer bearing the contact and whose position is to be transmitted to a remote station moves along a regulating resistance or a voltage divider at a short distance above them. For the purpose of transmitting the deflection of the pointer, the pointer contact is brought in contact with the resistance arrangement at periodic intervals by the action of a depressing bar. The deflection of the pointer making the contact can be read off at an electric measuring instrument (ammeter or voltmeter) which with the resistance arrangement and the pointer carrying the contact are connected in an electric circuit.

This known system or arrangement has amongst others the drawback that when the contact ceases between the contact carrying pointers and the resistance arrangement the circuit for the electric measuring instrument is interrupted and the indicating member of the measuring instrument then tends to return to its zero position.

According to our invention this drawback is eliminated by the electrical measuring instrument located at the receiving station being connected by a distance wire line with at least two pointers serving as transmitters, the pointers measuring the same value and being alternately brought to make contact with the respective resistance arrangement so that always at least one of the pointers makes contact. The measuring instrument connected with the two pointers indicates at the receiving station a mean value of the two values which would correspond with the individual pointer deflections. The two values generally differ the less the shorter the periods are between the making and breaking of the contact at the pointers.

Figure 2:
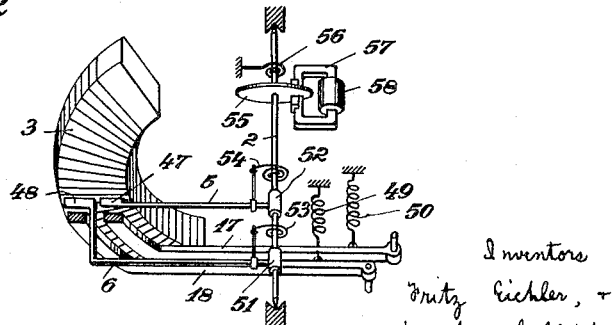

Several embodiments of our invention are illustrated in the drawings affixed hereto. These drawings represent in:

Fig. 1, an embodiment of our invention in which all the switch-gear is shown in plan, together with the connections, Fig. 2, a detail of Fig. 1 in sectional side-elevation on an enlarged scale, Fig. 3, another embodiment of our invention in which the individual component parts of the switch-gear are shown in plan and the connections are also indicated, Fig. 4, a further embodiment for the arrangement of two pointers carrying contacts, in side-elevation, Fig. 5, another embodiment of our invention with two contact carrying pointers in plan, and Fig. 6, an assembly view of a still further embodiment in which the individual parts of the switch-gear are shown in plan.

Identical parts are indicated by the same numerals of reference throughout all the figures of the drawings.

Referring to Fig. 1, which shows an embodiment of our invention for the multiple transmission of the positions of pointers of measuring instruments of any construction, two measuring instruments are illustrated the details of which can be seen in Fig. 2 of the drawings. Below a resistance 3 connected as voltage divider with the lines 7 and 8 move two pointers 5 and 6 both mounted on a common spindle 2. As a rule the pointers 5 and 6 do not touch the resistance 3. Below the paths of the pointers are provided two depressing bars 17, 18 which when their electromagnets 11 and 12 are de-energized force the pointers 5 and 6 against the resistance 3 and thus cause the closing of the contacts. The design is such that bar 17 operates the pointer 5 only and bar 18 the pointer 6 only. The two pointers 5 and 6 are connected with one pole of an electric measuring instrument 20 by means of a line 14 which measuring instrument may, for instance, be a voltmeter. The other pole of the measuring instrument 20 is connected with the line 7 through a line wire 26, another electric measuring instrument such as an ammeter, and a line 15. The two lines 7 and 8 are fed from a source of electric current, for instance, a battery 9. The second instrument with the pointers 5 and 6' is of exactly the same construction as the above described instrument Identical parts of both instruments are indicated by like numerals of reference, which in the case of the second instrument only differ by an index dash and are marked thus 5', 6', 11', 12' and so on. For the excitation and de-excitation of the depressing bar magnets 11 and 12 or 11' and 12' respectively a change-over switch 21 is provided. The windings of the electromagnets 11 are connected with the change-over switch 21 by means of the lines 23, 24, while the lines 45, 46 connect the exciter coils of the depressing bar magnets 12 with the change-over switch 21. The exciter windings of the bar magnets 11' and 12' of the second measuring instrument are connected in parallel relation to the windings of the respective bar magnets 11 and 12 of the first measuring instrument by the lines 23' and 24' or 45 and 46' respectively. The change-over switch 21 is connected with a battery 123. In the position shown in full lines it closes the circuit for the bar magnets 11 and 11', while the circuit for the bar magnets 12 and 12' is opened. In the position shown in dotted lines 21' the circuit for the exciter windings of the magnets 12 and 12' is on the other hand closed and that for the magnets 11 and 11' interrupted. The two pointers 5 and 6 are mounted upon the pointer spindle 2 in the manner illustrated in Fig. 2. The ends of the pointers 5 and 6 are fixed upon sleeves 51, 52 which are loosely placed upon the shaft 2. The pointers 5 and 6 are furthermore connected with one end of spiral springs 53, 54 which with their other ends are fixed to the spindle 2. At the free end of the pointers 5 and 6 are provided contacts 47, 48 adapted to make contact with the resistance arrangement 3 under the action of the depressing bars 17, 18. When the bar magnets 11 and 12 are de-energized the bars come under the influence of springs 49, 50 which force them upon the contacts 47, 48 and bring these contacts in the closing position. As drive for the spindle 2 an instrument 55 to 58 of the well-known Ferraris type is illustrated in the drawings. The Ferraris disc 55 is fixed upon the spindle 2 and maintained in the zero position by a spring 56. The exciter magnet 57 and the Ferraris disc 55 carries a winding 58, which is adapted to be connected with a source of current in well known and therefore not illustrated manner.

The arrangement or system operates in the following manner: When the magnet 57 is energized the Ferraris disc 55 starts to rotate against the resistance of the spring 56 and moves the two pointers 5 and 6. The change-over switch 21 is then alternately moved into the position indicated in full lines and in broken lines in the Fig. 1, either by hand or by mechanical means, such as a time switch. In the position shown in full lines the depressing bar 17 forces the contact 47 of the pointer 5 upon the resistor 3 under the action of its spring 49 so that through the line 7, resistance 3, contact 47, pointer 5 line 14, instrument 20, line 26, instrument 27 and line 15 the circuit for the voltmeter 20 is closed which gives an indication corresponding with the position of the pointer 5. If now the change-over switch 21 is moved into the position shown in dotted lines 21', the pointer contact 48 is forced into contact with the resistance by the depressing bar 18. The circuit for the voltmeter 20 remains closed across this contact so that the voltmeter 20 constantly shows a deflection which corresponds with the deflections of the pointers 5 and 6.

At the moment when the change-over switch 21 is moved from the position shown in full lines into the position shown in dotted lines, the circuits for both bar magnets 11 and 12 are interrupted and both pointer contacts 47, 48 are therefore closed. At least one of the pointer contacts is therefore always closed. The voltmeter 20' consequently indicates the deflection of the pointers 5' and 6'. The indications of both instruments 20 and 21 are integrated by the ammeter 27 connected in series with them.

Referring to Fig. 3 another arrangement is shown of the two pointers the deflection of which is to be transmitted. Both pointers 10 and 10' belong to separately arranged but similar measuring instruments 1 and 1'. They move over voltage dividers 4 and 4' which are connected with the network lines 7 and 8. Both pointers 10 and 10' are connected in parallel relation by means of a line 13 and joined to the terminal 16 of the voltmeter 19, the other terminal 22 of which is connected with the network line 7 through the line 25. The pointers 10 and 10' are caused to make contact by depressing bars 73 and 73' which are operated by magnets 40 and 40'. The arrangement in this figure is such that the pointers 10 and 10' move above the resistances 4 and 4' without usually coming in contact with them and are brought into the contacting position by the bars 73 and 73' when the magnets 40 and 40' are energized. The energizing circuits for the magnets 40 and 40' are again alternately so closed, in a manner not illustrated, that at least one of the pointers 10 and 10' always makes contact. Otherwise the arrangement is similar to that described with reference to Figs. 1 and 2.

In the embodiment of our invention illustrated in Fig. 4 of the drawings, the pointers 30 and 31, the position of which is to be transmitted to a remote station, are resiliently connected with a spindle 28 by means of spiral springs 34, 35. The spindle is rotated from a spindle 44 by means of spur wheels 43. Upon the spindle 28 there is furthermore mounted a pointer 29. The contacts of the two pointers 30 and 31 are adapted to move above two different resistances 32 and 33 without touching them. Otherwise the connections and operation of the pointers are the same as in Fig. 1 or in Fig. 3.

The embodiment illustrated in Fig. 5 of the drawing corresponds essentially with the embodiment shown in Fig. 3. Two pointers 10 and 10' are adjusted by two separate measuring instruments 1 and 1'. In contrast with Fig. 3 the free ends of the two pointers 10 and 10' move over a common resistance 4'' which is connected with the network lines 7 and 8. The paths of the front ends of the pointers 10 and 10' are indicated in broken lines.

In Fig. 6 of the drawing another embodiment of our invention is illustrated in plan.

The two pointers 63 and 64 the positions of which are to be transmitted are mounted upon a spindle 62. The pointer 64 is rigidly connected with the spindle 62, while the pointer 63 is resiliently mounted upon the spindle by means of a spiral spring 65. Both pointers 63 and 64 move above a resistance when the spindle 62 is adjusted. One end of the resistance is connected with one pole of a battery 59. The other pole of the battery 59 is connected with the pointers 63 and 64 through an ammeter 60 and a line 61. The contacts 66 and 67 fixed upon the front ends of the pointers 63 and 64 are brought into electrical contact with the resistance 68 by the depressing bars 69, 70. The energization of the bar magnets 71 and 72 again takes place by always at least one of the pointer contacts 66 and 67 touching the resistance 68 and thus closing the circuit for the measuring instrument 60. Since the circuit for the measuring instrument 60 remains thus permanently closed, the instrument indicates continuously the amount of resistance connected in circuit by the pointers 63 and 64 without returning to the zero position during service.

Our invention is mainly intended for the transmission of the indications of measuring instruments. It is obvious, however, that the adjustment of the pointers, the positions of which are to be transmitted to a remote station may be effected by any other suitable driving devices or means.

We desire to have it distinctly understood that we do not intend to limit ourselves to the exact details shown or described, but that we intend to include as part of our invention all such obvious changes and modifications of parts as would suggest themselves to persons skilled in the art and as would fall within the scope of the claims.

We claim as our invention:

1. In a system for the remote transmission of the positions of pointers, in combination, an electric resistance arrangement, a source of electric current, an electric measuring instrument, at least two pointers for indicating the same value and adapted to make electric contact with the said resistance arrangement, suitable electric connections between said resistance arrangement the said source of current, the said measuring instrument and the said pointers so that the said electric measuring instrument indicates the current values determined by said resistance arrangement and means adapted to bring said pointers alternately in electric contact with said resistance arrangement so that always at least one of said pointers makes electric contact.

2. In a system for the remote transmission of the positions of pointers, in combination, an electric resistance, a source of electric current, an electric measuring instrument, at least two pointers for indicating the same value and adapted to make electric contact with the said resistance, suitable electric connections between said resistance, the said source of current, the said measuring instrument and the said pointers so that the said electric measuring instrument indicates the current values determined by said resistance and means adapted to bring said pointers alternately in electric contact with said resistance so that always at least one of said pointers makes electric contact.

3. In a system for the remote transmission of the positions of pointers, in combination, an electric resistance arrangement, a source of electric current, an electric measuring instrument, a rotary spindle, at least two pointers connected with the said rotary spindle to follow its rotation and adapted to make electric contact with the said resistance arrangement, suitable electric connections between said resistance arrangement, the said source of current, the said measuring instrument and the said pointers so that the said electric measuring instrument indicates the current values determined by said resistance arrangement, and means adapted to bring said pointers alternately in electric contact with said resistance arrangement so that always at least one of said pointers makes electric contact.

4. In a system for the remote transmission of the positions of pointers, in combination, an electric resistance arrangement, a source of electric current, an electric measuring instrument, an adjustable rotary spindle, a pointer resiliently mounted upon said rotary spindle, a second pointer connected with said rotary spindle, both said pointers being adapted to make electric contact with said resistance arrangement, suitable electrical connections between said resistance arrangement, the said source of current, the said measuring instrument and the said pointers so that the said electric measuring instrument indicates the current values determined by said resistance arrangement, and means adapted to bring said pointers alternately in electric contact with the said resistance arrangement so that at least one of said pointers always makes electric contact.

5. In a system for the remote transmission of the positions of pointers, in combination, an electric resistance, a source of electric current, an electric measuring instrument, an adjustable rotary spindle, pointers mounted upon said rotary spindle to follow its rotation, at least one of them having resilient connection with said spindle, both of said pointers being adapted to make electric contact with said resistance, suitable electrical connections between said resistance, the said source of current, the said measuring instrument and the said pointers so that the said electric measuring instrument indicates the current values determined by said resistance, and means adapted to bring said pointers alternately in electric contact with the said resistance so that always at least one of said pointers makes electric contact.

6. In a system for the remote transmission of the positions of pointers, in combination, a plurality of electric resistances, a source of electric current, a plurality of electric measuring instruments, a plurality of pairs of pointers, all of said pointers adapted for the indication of the same value and each of said pairs of pointers adapted to make contact with one of the said plurality of resistances, suitable electric connections between each of the said resistances, the said source of current, the said measuring instruments and the said pointers so that the said electric measuring instruments indicate the current values determinal by the respective resistances, electro-magnetically operated means adapted to bring the pointers of the said pairs alternately in electric contact with the said respective resistance so that always at least one of the pointers of the said pairs of contacts makes contact, and an electric measuring instrument so connected with the said source of current and the said plurality of electric measuring instruments that it is adapted to indicate the sum of the indications of the said plurality of measuring instruments.

In testimony whereof we affix our signatures.

FRITZ EICHLER.
MANFRED SCHLEICHER.